United States Patent Office 3,320,264
Patented May 16, 1967

3,320,264
AMINO ALKYL ESTERS OF α-(4-CHLORO-
BUTOXY)-BENZILIC ACID
Josef Klosa, Berlin-Zehlendorf, Germany, assignor to
Rhein-Pharma Arzneimittelgesellschaft m.b.H., Heidelberg, Germany
No Drawing. Filed Oct. 1, 1963, Ser. No. 312,856
Claims priority, application Germany, Oct. 11, 1962,
K 47,947
7 Claims. (Cl. 260—294.3)

The invention relates to new analgesic and spasmolytic compounds and more particularly to new esters of α-(4-chlorobutoxy)-benzilic acid.

It is an object of the present invention to provide a new series of compounds with highly effective analgesic and spasmolytic action.

It is another object of the present invention to provide a method of achieving analgesia and spasmolytic action.

It is yet another object of the present invention to provide a new series of esters of α-(4-chlorobutoxy)-benzilic acid, which compounds are useful for pharmacological purposes, and particularly to achieve analgesia and spasmolytic action.

It is still another object of the present invention to provide methods of producing the compounds of this invention.

Other objects and advantages of the present invention will be apparent from a further reading of the specification and of the appended claims.

With the above and other objects in view, the present invention mainly comprises a compound selected from the group consisting of compounds of the formula:

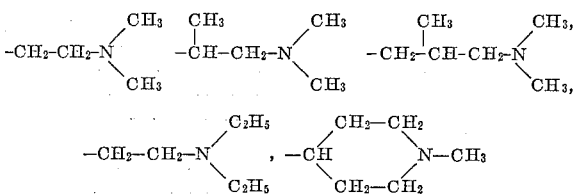

wherein R is selected from the group consisting of dilower-alkylamino-loweralkyl, and 5 and 6 member heterocyclic nitrogen-containing radicals, and physiologically compatible acid addition salts thereof.

Among the most preferred of the substituents R are the following:

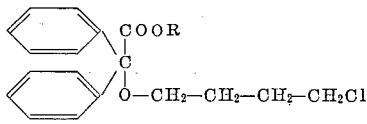

In addition to the N-methylpiperidyl radical for the substituent R, other heterocyclic nitrogen-containing radicals are morpholinyl, N-methylmorpholinyl, piperizinyl, piperidyl, and pyrazolinyl. It is most preferred that the dialkylaminoalkyl radical or the heterocyclic nitrogen-containing radical carry a methyl group.

One method of producing the compounds of the present invention comprises the etherification of the corresponding benzilic acid-dialkylaminoalkyl ether or its functional derivative, such as the α-chlorobenzilic acid-dialkylaminoalkyl ester of the following formula:

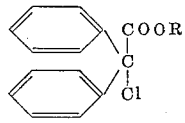

wherein R has the same definition as above, by heating this ester with 4-chlorobutanol while blowing off the formed hydrogen chloride.

Examples of α-chlorobenzilic acid dialkylaminoalkyl ester utilizable in the above process are α-chlorobenzilic acid-dimethylaminoethyl ester, α-chlorobenzilic acid-diethylaminoethyl ester, α-chlorobenzilic acid-dimethylaminoisopropyl ester, α-chlorobenzilic acid-β-methyl-γ-dimethylaminopropyl ester, α-chlorobenzilic acid-(N-methylpiperidyl-(4)-oxy)-ester.

This method of proceeding is particularly simple and advantageous. The hydrochloride of the ester is directly obtained by dilution of the reaction mass with ether.

Another method for the production of the compounds of the present invention comprises the esterification of α-(4-chlorobutoxy)-benzilic acid of the following formula:

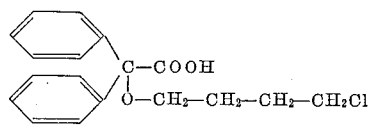

or its functional derivative, such as esters and acid chlorides, with the chosen dialkylaminoalkanol. It is particularly advantageous to use as the alcohol β-dimethylaminoethanol, β-diethylaminopropanol, β-methyl-γ-dimethylaminopropanol, and 1-methyl-4-hydroxy-piperidine. It is also advantageous to carry out the method of producing the compounds of the present invention by boiling the α-(4-chlorobutoxy)-benzilic acid with the functional derivatives of the dialkylaminoalkanols, such as β-dimethylaminoethyl chloride or the like in isopropanol. This results in the direct production of the hydrochloride of the new compounds in great purity.

The compounds of the present invention can be used in the form of the acid addition salts thereof with any physiologically compatible acid, including hydrochloric acid, sulfuric acid, nitric acid, maleic acid, malonic acid, fumaric acid, citric acid, succinic acid, etc.

The compounds of the present invention possess outstanding pharmacological properties. They possess an extremely strong analgesic and an extremely strong spasmolytic action, which is actually stronger than the action of α-ethoxybenzilic acid-dimethylaminoethyl ester (Substance I). This compound (I), or its hydrochloric acid addition salt, in addition possesses the disadvantage of difficult water solubility. It is thus, for example, hardly possible to prepare 5 to 10% aqueous solutions, since the esters always precipitate out. Consequently, it would be expected that the hydrochloride of the compounds of the present invention, for example of α-(4-chlorobutoxy)-benzilic acid-(β-dimethylaminoethyl) ester (Substance III), because of the longer alkoxy group would be still less water soluble. Quite surprisingly, this is not the case. The compound of the present invention (which is referred to as Substance III for convenient identification in the table below) is remarkably easily soluble in water. Thus, 1 g. of Substance III can be easily dissolved in 1–2 cc. of water without warming.

Not only are the physical-chemical characteristics of the compounds of the present invention surprising, but the pharmacological action thereof is also extremely surprising. Thus, it is known that with compounds of this class, the analgesic action is considerably lowered if the ethoxy group of Substance I is replaced by a methoxy, propoxy or butoxy group. (Archive Pharmacy, 287, 321 (1954), 288, 43 (1955).) The compound α-(β-chloroethoxy)-benzilic acid-β-dimethylaminoethyl-ester (Canadian Journal of Chemistry, 38, 1231–1233 (1960)) is also known. This ester, however, in the form of its hydrochloride (Substance II) only exhibits a very poor water solubility and is pharmacologically no more active than is Substance I.

The surprisingly effective pharmacological activity of the compounds of the present invention is illustrated by the comparative data set forth in the table below wherein the compound of the present invention (Substance III) is compared with known compounds (Substances I and II):

| Substance No. | $LD_{50}$ subcutaneous white mice in mg./kg. | Analgesia Morphine =1 | Spasmolytic action $BaCl_2$ Papaverin =1 | On Guinea pigs Acetylcholine Atropine =100 |
|---|---|---|---|---|
| I | 180 | 0.25 | 5 | 4 |
| II | 200 | 0.25 | 20 | 15 |
| III | 220 | 1.1 | 400 | 100 |

The toxicity is calculated according to the method of Kaerber and the analagesia is tested according to known methods on mice and on rabbits.

Substance III is breathing-analeptic active, while morphine is breathing-paralyzing active, which is clinically disadvantageous. Substance III moreover possesses strong anticonvulsive properties. The pharmacodynamic superiority of the compounds of the present invention is apparent from the above table.

The following examples are given to illustrate the production of the compounds of the present invention in accordance with the different methods of producing the same. The scope of the invention is not, however, meant to be limited to the specific details of the examples.

*Example 1*

18 g. of α-chlorobenzilic acid-(β-dimethylaminoethyl)-ester-hydrochloride are heated with 25 cc. of 4-chlorobutanol under stirring at a temperature of 80–100° C. for 6 to 8 hours with a weak stream of air being drawn off. The solution is then mixed with 3 to 5 times its volume of ether. An oil precipitates, which after several hours of standing in an ice box solidifies to crystalline form. The melting point is 102–104° C. The yield is about 12 g. of the hydrochloride of α-(4-chlorobutoxy)-benzilic acid-(β-dimethylaminoethyl)-ester. The free base is an oil.

If the heating is carried out only at a temperature of 60 to 80° C. and after completion of the heating the stirring is continued at room temperature for an additional 3 to 4 hours and the reaction mixture then diluted with ether, there are obtained colorless needle-like crystals having a melting point of 161–163° C. The elementary analysis of both compounds (that is the compounds produced by either method) is the same showing the compound to be α-(4-chlorobutoxy)-benzilic acid-β-dimethylaminoethyl)-ester-hydrochloride.

In an analagous manner, 4-chlorobutanol and α-chlorobenzilic acid - (β-methyl-γ-dimethylaminopropyl)-ester-hydrochloride are reacted to form the hydrochloride of α-(4-chlorobutoxy)-benzilic acid-(β-methyl-γ-dimethylaminopropyl)-ester which melts at 113–115° C. The yield is 60%. The ester is strongly hygroscopic and very easily soluble in water. The free base is an oil.

In an analogous manner, 4-chlorobutanol and α-chlorobenzilic acid - (β-diethylaminoethyl)-ester-hydrochloride are reacted to form the hydrochloride of α-(4-chlorobutoxy) - benzilic acid-(β-diethylaminoethyl)-ester which melts at 103–105° C. The substance is very strong hygroscopic and crystallizes only with great difficulty. The free base is an oil.

*Example 2*

16 g. of α-(4-chlorobutoxy)-benzilic acid (produced from α-chlorobenzilic acid-ethyl ester by cooking with 4-chlorobutanol and subsequent saponification with dilute acids or weak bases) are heated under refluxing with 8 g. of β-dimethylaminoethyl-chloride in about 60 cc. of absolute isopropanol for 18 hours. The reaction mass is then filtered and the solution concentrated under vacuum to one-third of its volume. The residue is diluted with 50–70 cc. of ether. An oil precipitates out which solidifies to crystalline form. The melting point is 108–110° C. The yield is 80%.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, are intended to be comprehended within the meaning and range of equivalence of the following claims.

What is claimed and desired to be secured by Letters Patent is:

1. A member selected from the group consisting of compounds of the formula:

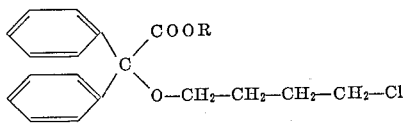

wherein R is selected from the group consisting of di-lower alkyl amino-lower alkyl, N-methyl piperidinyl, morpholinyl, N-methyl, morpholinyl, piperizinyl, piperidinyl, and pyrazolinyl, and physiologically compatible acid addition salts thereof.

2. α-(4-chlorobutoxy)-benzilic acid-(β-dimethylaminoethyl)-ester.

3. α - (4-chlorobutoxy)-benzilic acid-(β-diethylaminoethyl)-ester.

4. α - (4-chlorobutoxy)-benzilic acid-(dimethylaminoisopropyl)-ester.

5. α - (4-chlorobutoxy)-benzilic acid-(β-methyl-γ-dimethylaminopropyl)-ester.

6. α - (4-chlorobutoxy)-benzilic acid-(N-methylpiperidyl-(4)-oxy)-ester.

7. α - (4-chlorobutoxy)-benzilic acid-(N-methylpiperidyl-(4)-oxy)-ester hydrochloride.

References Cited by the Examiner

UNITED STATES PATENTS

| | | | |
|---|---|---|---|
| 1,915,334 | 6/1933 | Salzberg et al. | 260—243 |
| 2,075,359 | 3/1937 | Salzberg et al. | 260—243 |
| 2,387,447 | 10/1945 | Hoffman et al. | 294.3 |
| 2,394,770 | 2/1946 | Hill | 294.3 |
| 2,425,320 | 8/1947 | Hill | 252—149 |
| 2,437,035 | 3/1948 | Morrison et al. | 294.3 |
| 2,606,155 | 8/1952 | Hill | 252—149 |
| 2,652,399 | 9/1953 | Clinton | 260—294.3 |
| 2,863,909 | 12/1958 | Panizzi et al. | 260—473 |
| 3,004,889 | 10/1961 | Kuna et al. | 167—65 |
| 3,010,873 | 11/1961 | Cavallini | 167—65 |

FOREIGN PATENTS 641,571 8/1950 Great Britain.
861,377 2/1961 Great Britain.

OTHER REFERENCES

Chubb et al.: Can. J. of Chem., vol. 36 (1960), pp. 1231–1233, QD1C2.

Klosa et al.: J. Prackt Chem., vol. 16, (1962) pp. 71–82, TP1J89.

WALTER A. MODANCE, *Primary Examiner.*

NICHOLAS S. RIZZO, *Examiner.*

JOSE TOVAR, AVROM D. SPEVACK,
*Assistant Examiners.*